June 16, 1964
R. L. SIMPSON
3,137,315
CURTAIN VALVE
Filed May 17, 1963
2 Sheets-Sheet 1
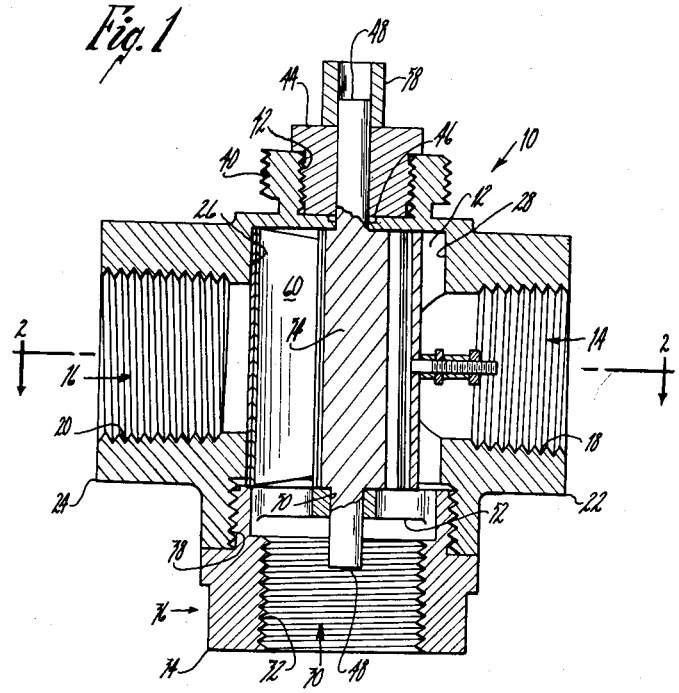
INVENTOR.
ROBERT L. SIMPSON
BY
ATTORNEYS

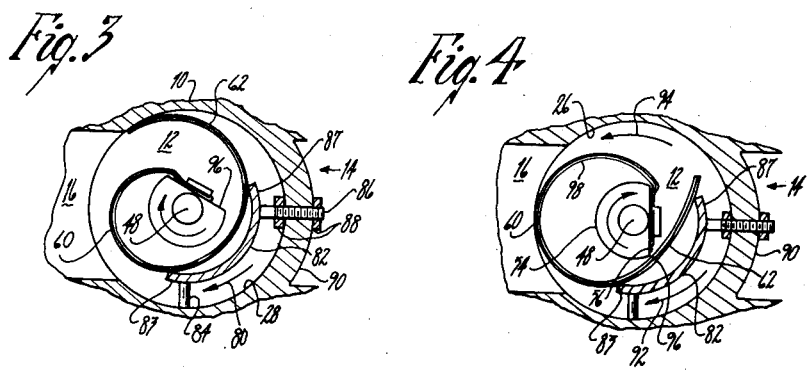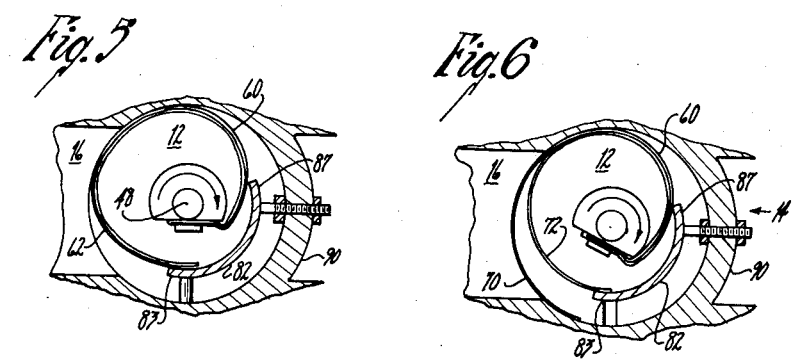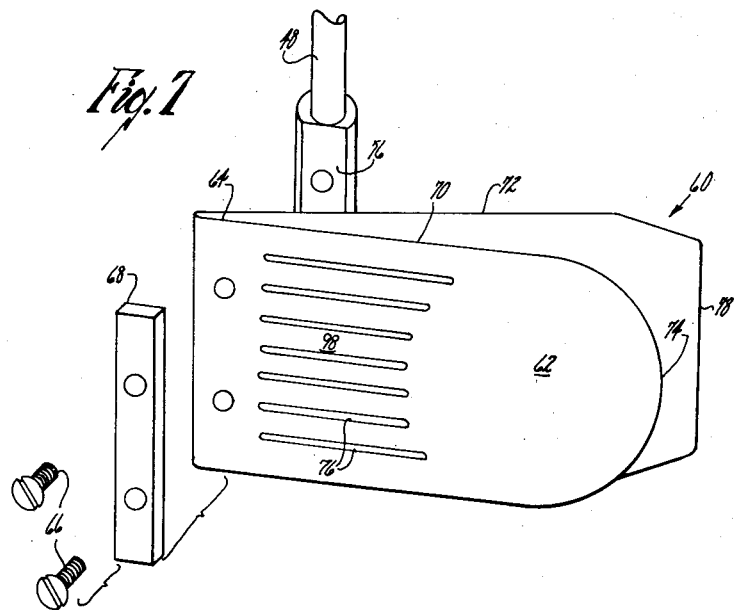

United States Patent Office 3,137,315
Patented June 16, 1964

3,137,315
CURTAIN VALVE
Robert L. Simpson, Farmington, Conn.
(R.F.D. 1, Elmwood, Conn.)
Filed May 17, 1963, Ser. No. 281,248
13 Claims. (Cl. 137—625.28)

This invention relates to valves and, more particularly, to valves of the type which employ a resilient diaphragm as a valve member.

It is the general object of this invention to provide a valve of this type, usually referred to as a curtain valve, which is characterized by simplicity of construction and which nevertheless requires a minimum operating torque throughout a wide range of operating conditions.

A more specific object is to provide such a valve in which the diaphragm can be precisely located by angular positioning of an external actuator, the diaphragm being securely held to meter the flow through the valve even at high rates of flow.

Another specific object is to provide a curtain valve which in the open position permits fluid to flow around both sides of a centrally located drum to which the diaphragm is attached.

A still further specific object is to provide a curtain valve wherein the diaphragm is relatively thin so as to seal properly an outlet port but which diaphragm is designed to withstand relatively high inlet pressures as a result of a multilayer construction.

A still further specific object is to provide a curtain valve in which an inlet port is unaffected by a spirally shaped diaphragm although the inlet port is located the same distance from a centrally located rotary actuator as is the outlet port, which ports may also be diametrically opposed in relation to the actuator without adverse effect on the valve's operation.

A still further specific object is to provide a curtain valve which does not automatically close when the normal direction of flow therethrough is reversed.

The drawings show several embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a vertical longitudinal section through a curtain valve embodying the present invention.

FIG. 2 is a horizontal longitudinal section taken as indicated by the line 2—2 in FIG. 1 and showing a resilient diaphragm or curtain in closed position.

FIG. 3 is a fragmentary horizontal longitudinal section showing the diaphragm in a partially open position.

FIG. 4 is a fragmentary horizontal longitudinal section showing the diaphragm in its fully open position.

FIG. 5 is a fragmentary horizontal longitudinal section showing the diaphragm in a partially closed position.

FIG. 6 is a fragmentary horizontal longitudinal section showing the outer layer of a two-layer diaphragm in closed position and the inner layer just prior to closing.

FIG. 7 is a perspective view of a spiral type diaphragm of the present invention and shows its double layer construction.

FIG. 8 shows an alternative diaphragm and actuating member construction.

Referring now to the drawings, a valve of the curtain type embodying the present invention is illustrated generally at 10. The external form of the valve may take a variety of shapes such as hexagonal or cylindrical, the housing 10 being preferably cast from a material suitable for the fluid to be handled by the valve. A valve chamber 12 is defined by the housing 10 and is preferably cylindrical with inlet and outlet ports 14 and 16 communicating therewith. As shown the ports 14 and 16 are on opposite sides of the chamber 12 and they communicate with threaded bores 18 and 20 in radial bosses 22 and 24 adapted for connecting the valve to aligned pipes not shown.

As presently preferred, the outlet port 16 is circular in cross section and its valve seat is indicated generally at 26 being formed by the peripheral wall 28 of the cylindrical valve chamber 12. The port 16 is also located midway along the lateral side of the cylindrical wall as shown.

The inlet port 14 is similarly arranged on an opposite side of said chamber 12 from the outlet port 16 but such a location is not essential to the present invention and fluid can be admitted to the valve chamber through a lower port 30 which also communicates with the chamber 12 as shown. The lower port 30 commmunicates with a threaded bore 32 in an axial coupling 36 which is threadably received in a threaded bore 38 in the lower end of the housing 10.

Thus, two inlet ports 14 and 30 communicating with the chamber 12 are provided in the curtain valve as presently constructed permitting either a right angle or straight through flow arrangement with a plug or the like being utilized to cover the unused port.

At its upper end portion the valve housing 10 has an integrally formed and axially upwardly projecting boss 40 which has an axially extending threaded bore 42 therein. The bore 42 does not communicate with the upper end of the valve chamber 12 but is adapted to receive a threaded plug 44 which engages and holds an annular seal 46 about an upper portion of an actuator 48. The actuator 48 is slidably received in the plug 44 and projects therethrough providing a means for rotating the same which is accessible externally of the housing 10.

Further, the actuator 48 extends vertically downwardly and axially in the valve chamber 12 so that its axis of rotation coincides with the longitudinal center line of the cylindrical valve chamber. The lower end of the actuator 48 is received in a suitable bore 50 formed in an integral cross member 52 in the coupling 36, which cross member does not block the lower port 30 but provides a support bearing for the actuator 48. The aforesaid upper and lower end portions of the actuator 48 are both of circular cross section as shown. A central portion 54 is circular in part but of somewhat larger diameter as best shown in FIG. 2. This approximately semicircular portion comprises at least one flat surface 56 forming a chord line roughly tangent to the smaller actuator diameter as shown in the cross sectional view of FIG. 2.

From the foregoing it will be apparent that the actuator 48 may be rotated manually or by other means to swing the flat surface 56 of said actuator through 360° or a lesser angular distance in the valve chamber 12. While the invention is not so limited, the valve shown is adapted for manual operation and a handle 58 is connected to the actuator 48 at the upper end thereof for convenient rotation thereof.

Disposed within the valve chamber 12 and adapted for opening and closing movement therein is a resilient diaphragm or valve member 60 best shown in FIG. 2. In accordance with the invention, the diaphragm 60 is constructed and located in the valve chamber 12 so as to close said outlet port 16 by reason of the contact between a trailing end portion 62 of said diaphragm 60 and that part of the peripheral wall 28 which defines the outlet valve seat 26. Further in accord with the invention, the diaphragm 60 is coiled within the chamber 12 and attached at an inner end 64 to the flat surface 56 on said actuator 48. In the closed position the said trailing end portion is imperforate and covers the outlet port 16 as shown in FIG. 2. As so constructed and arranged rotation of the actuator will tend to pull the trailing edge 62 of the diaphragm 60 away from the outlet port 16, the coiled portion between said trailing end portion 62 and the fixed end 64 of the diaphragm being flexed in proportion to the torque required to rotate said actuator. Further rotation of the actuator pulls the valve member bodily away from said outlet port 16 in a peeling motion whereby to progressively open the port and to cause the trailing end portion 62 to slide across the outlet valve seat 26 in a wiping action to remove any scale or other foreign matter deposited thereon.

In the preferred embodiment of the invention shown, the resilient diaphragm 60 comprises a generally rectangular sheet metal member of spring steel or the like which is substantially flat when extended as shown in FIG. 7. As presently constructed this diaphragm comprises two layers which may be formed of one piece by bending it back along itself with the bend located at the inner end 64 of the spiral when said diaphragm is inserted in the chamber 12. By attaching said inner end to the flat surface 56 on the actuator by screws 66, 66 and a mounting bar 68, and coiling the diaphragm around the actuator 48, the resulting assembly can be readily inserted in the lower threaded bore 38 of the valve housing 10. As shown the trailing end portion 62 of the outer layer 70 and of the inner layer 72 is imperforate but intermediate these end portions and the inner end 64 the diaphragm is provided with openings 76, 76 to vary its resiliency along its length. The outer layer 70 has a circular trailing edge 74 of diameter equal to the width of said diaphragm which dimension is chosen so that the trailing end portion overlaps the circular outlet port by some predetermined amount. Tests have shown that a curtain valve seats most efficiently when the resilient diaphragm overlaps the outlet port by a predetermined amount which is uniform around the periphery of said port. Thus, the ideal valve member would be a circular disc of slightly larger size than the circular outlet port. Therefore, and according to the present invention, this desirable feature is achieved by appropriately shaping the trailing edge 74 of the sealing or outer layer 70 of the curtain valve member 60. In further accord with this attempt to control the resiliency of the sealing or outer layer 70 of the diaphragm 60 in the portion thereof which contacts the outlet port valve seat 26, the longitudinal openings 76, 76 are of varied lengths originating near the inner end 64 and extending toward the trailing end portion 62 of said outer layer 70 to produce a curtain valve closely approaching the ideal circular disc mentioned above.

As shown in FIG. 2, said trailing end portion 62 of the diaphragm 60 contacts the seat 26 and closes the port 16 when the actuator 48 is in its closed position. Fluid under pressure from the inlet port 14 acts on the inner side of trailing end portion 62 helping to seal said port. The inherent spring force of the diaphragm itself, tending to expand outwardly, also aids in sealing, especially at low pressures when fluid pressure cannot be relied on to hold the diaphragm in closed position.

As the actuator 48 is rotated from the closed position towards the open position the circular free edge 74 of the outer layer 70 of said diaphragm is not the most desirable shape. First, the crescent-shaped opening which would result has very sharp corners which could cause excessive turbulence in the flow therethrough. Second, the stresses in such a circular edged layer of sheet metal of the thickness required for proper seating would be such that the metal might be deformed rendering the valve unusable at high rates of flow and pressure. Third, the crescent-shaped opening formed would provide too rapid an increase in outlet port area for a given angular displacement of the actuator 48. Therefore, to avoid these disadvantages, the inner layer 72 of the diaphragm 60 is provided with a noncircular and preferably a straight edge 78 as shown in FIG. 7. An alternative construction, shown in FIG. 8, is to use a single layer diaphragm 60a having a straight trailing edge 78a but with metal added to the edge for increasing the diaphragm stiffness at this point. As shown one method of stiffening the the edge 78a is to braze a rod 79 thereto so that the diaphragm does not deform even at high rates of flow. As so constructed the single layer diaphragm will also benefit from the various advantages of the present invention outlined herein. Also shown in FIG. 8 is an alternative construction for the diaphragm and the actuating means for rotating the diaphragm. As shown an inner edge 64a of the diaphragm is bent at some angle greater than 90° and is received in a slot 56a in a central portion 54a of the actuator 48a. The diaphragm 60a is tightly coiled around said central portion 54a at least once and it should be noted that the slot 56a is so related to the circumference of said central portion 54a that the portion of the diaphragm 60a passing over the slot 56a has very nearly the same or preferably a slightly greater radius of curvature than that portion of the diaphragm which is coiled around the circular central portion 54a of the actuator. In this manner the fatigue life of the diaphragm is greatly increased due to the lower stress concentrations possible with this method of attaching the diaphragm to its actuator. It will be apparent that this method of attaching the spiral diaphragm to a rotary actuator is equally applicable to the double layer diaphragm 60 and hence this particular construction, though not specifically shown, is deemed to be within the scope of the present invention.

In FIG. 3 the diaphragm 60 is shown in a partially open position, the actuator 48 having been rotated through an angle of approximately 150° in a clockwise direction from its FIG. 2 position. As so positioned the valve chamber 12 is blocked by spiral diaphragm 60 except for the opening therethrough indicated generally by the arrow 80.

As the actuator 48 and the spiral diaphragm 60 are rotated clockwise in the manner shown, a bridge or camming member 82 attached to the peripheral wall 28 engages said diaphragm providing means for more tightly coiling the diaphragm and preventing the trailing end portion thereof from contacting the wall defining said inlet port 14. The bridge 82 is shown as a separate member but could be cast as an integral part of the housing 10. As shown the bridge 82 is supported in spaced relation from the chamber wall 28 by a pair of spaced lands 84, 84 at one lateral edge 83 of said bridge 82 which lands may take any convenient shape but should not block the flow of fluid through the opening indicated generally by the arrow 80 of FIG. 3. A threaded support member 86 supports the other lateral edge 87 of said bridge, two nuts 88, 88 providing a convenient means for adjusting said bridge in its relation to the inlet port 14. As presently constructed a crosspiece 90 integrally formed with the housing 10 supports this threaded member 86 and divides the generally circular inlet port 14 into two semicircular openings as shown.

The bridge 82 is at least approximately partially circular in cross-sectional shape as indicated in FIGS. 2-6, the center of the radius of curvature thereof being approximately at the center line of the cylindrical valve chamber 12. Said bridge is arranged generally parallel to said center line and to the axis of the valve actuator 48. The lateral edges 83, 87, being parallel to each other and to said center line, provide a means for camming the diaphragm 60 in a uniform manner along the entire lateral dimension of said diaphragm.

In FIG. 4 the actuator 48 is shown rotated through an angle of approximately 210° from the closed position of FIG. 2. As so positioned the valve is fully open with two separate openings 92 and 94 for the passage of fluid therethrough. Thus the present invention provides a curtain valve of straight through type construction which valve has increased volumetric flow capability in the fully open position. Another advantage to the disclosed construction, not limited to the straight through construction but equally applicable to the above-mentioned right angle flow arrangement using the lower port 30 as an inlet, lies in the cam action achieved by the bridge 82. In causing the spiral-shaped diaphragm to be more tightly coiled or drawn radially inwardly with respect to the axis of the actuator 48, accurate positioning of the entire spiral is assured even when the valve handles high velocity flows. In effect the bridge 82 acts on the diaphragm to provide a means for storing the same in a position where it cannot oscillate or ovalize and otherwise deform periodically.

Referring again to FIG. 4 showing the diaphragm 60 in the fully open position it will be seen that the trailing end portion 62 thereof may be securely held in position as a result of the action of a corner 96, defined by the chord-like surface 56 of the actuator 48 and the circular portion 54 thereof, and the lateral edges 83, 87 of the bridge 82. It will be apparent that said corner 96 may provide a secondary cam action on the trailing end portion 62 of the diaphragm 60 and may be appropriately shaped to maximize the opening defined by said trailing edge 78 and the peripheral wall 28 of the valve chamber 12 whereby to provide for maximum flow in the direction of the arrow 94, in addition to securing said trailing end portion 62 against the impact of fluid flow.

Finally, still with reference to FIG. 4 wherein the diaphragm is in the full open position, it will be noted that the longitudinal openings 76 in the diaphragm 60 are so arranged that the flow area between the outlet valve seat 26 and the perforated portion 98 of said diaphragm 60 is effectively increased from the apparent flow area shown in FIG. 4. As a result of the longitudinally-shaped slots 76 in said perforated portion 98 an even greater rate of flow is realized in the direction of the arrow 94.

As the actuator 48 is rotated from the FIG. 4 position to the partially closed position of FIG. 5, the pressure of the incoming fluid on the inner side of the diaphragm will tend to close the outlet port 16. At high pressures, this tendency could so deform that part of the diaphragm adjacent the valve seat 26 as to cause a sudden closing of that side of the port 16 with incipient unpredictable flow metering as related to angular position of the actuator 48. In order to remedy this unfavorable characteristic of curtain valves, the diaphragm has been perforated as stated in the affected area. In this manner the fluid pressure across this part of the diaphragm is equalized and the torque required to operate the valve between the FIGS. 4 and 5 positions is rendered relatively constant. It is in part for this reason that the longitudinal openings 76 extend through both the inner 72 and outer 70 layers of said diaphragm 60. Another reason for these perforations in both layers of said diaphragm is to create a spiral diaphragm of resiliency which varies along its length, being most flexible in the area of greatest curvature.

In FIG. 5 the actuator 48 is shown rotated some 300° from its FIG. 2 position and illustrates the partially closed position wherein the imperforate trailing end portion 62 of the diaphragm 60 is effectively covering approximately one half the outlet port 16. Unlike most curtain valves, however, this position is not a transient one which occurs only instantaneously as inlet pressure is acting on the inner side of the curtain or diaphragm. In the valve of the present invention, this position can be maintained with little or no torque on the actuator 48. Additionally, this valve position can be repeated by merely rotating said actuator to the same angular position here illustrated regardless of the pressures involved, the diaphragm 60 being securely held by the bridge member 82. It will be noted that in reaching the FIG. 5 position the diaphragm has progressively uncoiled so as to gradually cut off the flow through the pasasgeway 94 of FIG. 4.

In contrast to this gradual closing action of passageway 94, FIG. 6 shows the trailing end portion 62 of the outer layer 70 shortly after it has snapped off the edge 83 of bridge 82. As so arranged rotation of the actuator to a position some 330° from the original FIG. 2 position produces a very positive closing action cutting off the flow of fluid in passageway 92 of FIG. 4. Both the pressure of the incoming fluid, and the spring force of the spiral diaphragm cause a snap action final closing of the valve and were it not for this action the trailing end portion 62 of the diaphragm would be forced against the chamber wall 28 before the valve is finally closed requiring excessive torque on the actuator in its last few degrees of rotational travel. Further rotation of the actuator 48, to the original FIG. 2 position, will cause the inner layer 72 of said diaphragm to leave the bridge 82, and place the diaphragm in the original closed position of FIG. 2. Alternatively, the two layers 70 and 72 could be constructed to snap off the bridge 82 simultaneously.

The invention claimed is:

1. The combination in a curtain valve of a housing defining a valve chamber having a wall and inlet and outlet ports, a rotatable valve actuator in said valve chamber in spaced relationship with the chamber outlet port, a resilient diaphragm valve member coiled within said chamber to a generally spiral shape with one end portion attached to said actuator and with the remaining portion extending arcuately toward and overlaying the chamber outlet port, said member serving to close and seal said outlet port and being movable to an open position at the urging of said actuator on rotation of the latter, and a camming member disposed in said chamber between said actuator and the chamber wall and serving to engage the valve member as it is moved to its open position and to bend the same to a more tightly coiled configuration whereby to provide a space at opposite sides thereof adjacent the chamber wall for the flow of fluid through the valve chamber.

2. The combination in a curtain valve as set forth in claim 1 wherein said camming member is at least approximately partially circular in cross section and disposed with a concave valve member engaging surface facing said actuator in spaced relationship with the actuator and on a side thereof at least approximately opposite said outlet port.

3. The combination in a curtain valve as set forth in claim 2 wherein said valve member includes at least two layers of sheet metal arranged in overlaying relationship in inner to outer order.

4. The combination in a curtain valve as set forth in claim 3 wherein said valve member is provided with openings in an area between its ends and which lies adjacent but not over the outlet port when the member is in its closed position.

5. The combination in a curtain valve as set forth in claim 3 wherein said valve chamber is generally cylindrical with a generally circular outlet port, and wherein the outer layer of said valve member has a generally circular shape at its free end on a radius slightly larger than that of the outlet port.

6. The combination in a curtain valve as set forth in claim 5 wherein the inner layer of said valve member has a free end portion which extends beyond the corresponding portion of the outer layer in at least one region.

7. The combination in a curtain valve as set forth in claim 6 wherein said inner layer has a substantially straight free end portion.

8. The combination in a curtain valve as set forth in claim 2 wherein said valve member is coiled at least once around said actuator, and said actuator has an axially extending slot to receive the innermost end of said diaphragm valve member.

9. The combination in a curtain valve as set forth in claim 8 wherein said actuator is generally cylindrical in shape except for said slot and wherein the slot defining portions of said generally cylindrical surface are so spaced radially that the portion of the diaphragm coiled around said actuator is of a relatively constant radius of curvature whereby to alleviate stress concentrations in said diaphragm and extend its fatigue life.

10. The combination in a curtain valve as set forth in claim 2 wherein said valve member includes stiffening means at its trailing edge portion.

11. The combination in a curtain valve as set forth in claim 10 wherein said stiffening means comprises metal added to the trailing edge portion of said diaphragm.

12. The combination in a curtain valve as set forth in claim 8 wherein said valve member is provided with openings in an area between its ends and which lies adjacent but not over the outlet port when the member is in its closed position.

13. The combination in a curtain valve as set forth in claim 12 wherein said valve chamber is generally cylindrical with a generally circular outlet port and wherein said valve member trailing end portion is substantially straight with metal added thereto to increase its lateral stiffness and prevent deformation thereof especially at high rates of flow through said valve outlet port.

References Cited in the file of this patent
UNITED STATES PATENTS

| | | |
|---|---|---|
| 2,105,331 | Rasmussen | Jan. 11, 1938 |
| 2,649,275 | Noyes | Aug. 18, 1953 |
| 2,678,661 | Roper | May 18, 1954 |
| 3,047,019 | Simpson | July 31, 1962 |

FOREIGN PATENTS

| | | |
|---|---|---|
| 298,612 | Switzerland | July 16, 1954 |